2,965,660

PROCESS FOR THE PRODUCTION OF CARBOXYLIC ACID ESTERS

Rudolf Heise and Wennemar Strauss, Dusseldorf-Holthausen, Germany, assignors to Dehydag, Deutsche Hydrierwerke G.m.b.H., Dusseldorf, Germany, a corporation of Germany No Drawing. Filed Mar. 27, 1956, Ser. No. 574,109

Claims priority, application Germany Mar. 28, 1955

7 Claims. (Cl. 260—410.9)

This invention relates to a process for the production of carboxylic acid esters by reduction of organic carboxylic acids with carbon monoxide or gaseous mixtures containing largely carbon monoxide in admixture with hydrogen and the like.

Various processes have been described in the prior art which disclose that organic carboxylic acids can be reduced to hydrocarbons at temperatures between 400 and 450° C. with the aid of carbon monoxide as the reducing agent and charcoal as the reduction catalyst. Similarly, it has also been disclosed that aldehydes can be obtained by reacting carboxylic acids in the gaseous phase with carbon monoxide or gaseous mixtures containing carbon monoxide at elevated temperatures in the presence of hydrogenation catalysts. However, nothing has been reported about the yields of aldehyde produced by this latter process, and there is no evidence that this method has been used on a commercial scale for the manufacture of aldehydes.

It is an object of the present invention to provide a process for the reduction of organic carboxylic acids into carboxylic acid esters of the corresponding alcohol with carbon monoxide which produces virtually quantitative yields of the ester.

Other objects and advantages of the present invention will become apparent as the description proceeds.

We have found that esters of carboxylic acids can be produced in a very simple fashion and with excellent yields by reacting the corresponding carboxylic acids in the liquid phase with carbon monoxide or gaseous mixtures containing principally carbon monoxide at elevated temperatures in the presence of certain catalysts. In some instances it is also advantageous to carry out the reaction at elevated pressures. The reaction may be represented by the following equation:

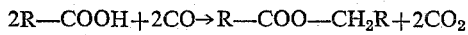

wherein R is an organic radical of the type usually found in organic carboxylic acids, such as an aliphatic radical, either saturated or unsaturated, or an aromatic or cyclo-aliphatic radical. As indicated by the above reaction equation, the reaction products are carbon dioxide and the carboxylic acid ester of the corresponding alcohol, unless a rearrangement takes place in the organic radical during the reaction, which may occur in the case of some unsaturated radicals or certain substituents. If the carboxylic acid starting material is composed of a mixture of different carboxylic acids, the reaction product is a mixture of esters which contains, as a rule, all of the theoretically conceivable combinations of fatty acids and fatty alcohols.

Organic carboxylic acids which may be transformed into esters by the process in accordance with the present invention are primarily the aliphatic carboxylic acids with a straight or branched carbon chain, such as fatty acids, carboxylic acids obtained by paraffin oxidation, and those which are obtained by oxidation of the products of an oxosynthesis or the Guerbet reaction. However, the present reaction is also applicable to the conversion of cyclo-aliphatic, aromatic and heterocyclic carboxylic acids, for example of naphthenic acid, resin acids, benzoic acid, naphthalene carboxylic acids, pyridine carboxylic acids, and the like, into the corresponding alcohol esters. Moreover, polybasic carboxylic acids, especially those of the aliphatic cycloaliphatic or aromatic series, may be converted into esters by the above-disclosed reaction. Finally, the reaction according to the present invention may also be employed to transform substituted and unsaturated carboxylic acids into their corresponding alcohol esters.

The reducing agent need not be pure carbon monoxide. For example, any gaseous mixture containing appreciable quantities of carbon monoxide is equally effective. Typical operative examples of gaseous mixtures which may be used as the reducing agent in the present process are mixtures of carbon monoxide and hydrogen, industrial gases such as water gas, producer gas and illuminating gas, and the like.

Catalysts which may effectively be used in the process herein disclosed include both metallic and nonmetallic catalysts. Especially effective are those known as hydrogenation catalysts; that is, catalysts consisting of elements of sub-group I (e.g. Ag, Cu), sub-group V (e.g. V), sub-group VI (e.g. Cr, Mo, W), sub-group VII (e.g. Mn), and sub-group VIII (e.g. Ni, Co, Fe, Pt, Pd, Rh, Ru) of the periodic table, in their free metallic state or as oxides or sulfides. Other suitable catalysts are carbonates and oxides of metals of groups II and III of the periodic table (e.g. $Al_2O_3$, BeO, $ZnCO_3$), silicic acid both in the free and combined form (e.g. $SiO_2$, diatomaceous earth, metal silicates), and other contact catalysts such as bentonite, fuller's earth, activated charcoal, and the like. These catalysts may be applied to carrier substances or may be activated by suitable additives, as customary in the chemical industry.

The conditions under which the reaction according to the present invention will proceed are variable within rather wide limits. While the conversion into the ester will take place at atmospheric pressures, it is advantageous to operate at elevated pressures from 10 to 500 atmospheres gauge, preferably between 100 and 250 atmospheres gauge, and at elevated temperatures not exceeding 400° C., as a rule. While it is not generally required, the reaction may also be carried out in the presence of solvents and diluents. The process may be operated as a batch process or also in a continuous fashion.

The reaction products obtained from the process according to our invention are useful as skin oils, ointment bases, lubricants, fat-liquoring agents for leather, or as raw materials in the manufacture of wax compositions, depending upon their consistency and molecular weight, and for similar purposes.

The following examples will further illustrate the present invention and enable others skilled in the art to understand our invention more completely. It is understood, however, that we do not intend to limit our invention to the materials and conditions recited in these examples.

Example I 500 gm. pure lauric acid were admixed with 100 gm. copper chromite, and the mixture was charged into an autoclave. Thereafter, carbon monoxide was introduced into the autoclave until the internal pressure was 100 atmospheres gauge. The autoclave and its contents were then heated to 280° C. and maintained at that temperature for about five hours. The reaction vessel was then allowed to cool a little, whereupon the internal pressure was released and the $CO—CO_2$ mixture was allowed to escape. Subsequently, the autoclave was again closed and fresh carbon monoxide was introduced until the internal pressure again reached about 100 atmospheres. The autoclave was again heated to 280° C. for five hours. The transformation of lauric acid into the dodecyl ester of lauric acid was practically quantitative. After seperating the copper chromite catalyst, the reaction product was purified by distillation; it passed over between 208–210° C. at 2 mm. Hg. Its melting point was 27° C., which corresponds to the melting point of dodecyl laureate reported in the literature. The characteristic values and other properties of the reaction product were also identical with the product formed by the reaction between dodecyl alcohol and lauric acid.

Example II 500 gm. of so-called hydrostearic acid (a mixture of palmitic and stearic acids), obtained by hardening technical grade oleic acid, were admixed with 50 gm. copper chromite. The mixture was then heated twice to 280° C. for five hours in an atmosphere of carbon monoxide at 100 atmospheres gauge, with intervening replenishment of gas, as described in Example I. The reaction product was then separated from the catalyst and subjected to refractive distillation. The principal amount, that is more than 90% of the theoretical amount, of the reaction mixture consisted of a mixture of cetyl palmitate, cetyl stearate, stearyl palmitate, and stearyl stearate. In addition, the reaction product contained about 1% untransformed fatty acids and very small quantities of hydrocarbons. Without the interposed replenishment of carbon monoxide, the wax ester content of the reaction mixture was only about 50%.

The procedure was repeated in an analogous fashion, but using a mixture of carbon monoxide and hydrogen instead of pure carbon monoxide. For the purpose of forming this mixture, carbon monoxide was first introduced into the reaction vessel until the internal pressure reached 50 atmospheres gauge, and thereafter hydrogen was forced into the vessel until the total internal pressure reached 150 atmospheres gauge. The same wax ester mixture as above was obtained with very good yield.

Example III 500 gm. of a fatty acid mixture (acid number=274, saponification number=276), obtained from coconut oil, were admixed with 100 gm. copper chromite and 5 cc. water, and the resulting reaction mixture was heated for five hours at 280° C. in an atmosphere of carbon monoxide at a pressure of 100 atmospheres gauge. Thereafter, the gas pressure was released, fresh carbon monoxide was introduced into the reaction vessel, and the temperature was again held at about 280° C. for five hours, substantially as described in Example I. 95% of the reaction product, which contained only traces of fatty acids and small amounts of paraffin, consisted of a mixture of wax esters. Upon purification, the mixture of esters was a colorless mass having an oily to pasty consistency.

Example IV 500 gm. of a fatty acid mixture, obtained from coconut oil as in Example III, were admixed with 100 gm. activated charcoal, and the resulting mixture was heated to 280° C. for eight hours in an atmosphere of carbon monoxide at a pressure of 200 atmospheres gauge. The gas pressure was then released and the reaction product was analyzed. In addition to non-transformed fatty acid and a few percentage points of hydrocarbons, the reaction product was found to contain the corresponding coconut fatty alcohol ester in a quantity corresponding to about 52.5% of the theoretical yield.

Example V 300 gm. of a fatty acid product (acid number=250, saponification number=255), obtained by fractionation of the acid mixture formed by oxidation of paraffin, were admixed with 30 gm. copper silicate, and the resulting mixture was placed into an autoclave. Carbon monoxide was then introduced into the autoclave until the internal pressure reached 150 atmospheres gauge. The autoclave and its contents were then heated to 280° C. for 10 hours. The reaction product was found to contain the corresponding fatty alcohol esters in quantities equivalent to 61% of the theoretical yield.

The above procedure was repeated, except that after five hours the gas pressure was released and the carbon monoxide replenished, as described in Example I, whereupon heating at 280° C. was continued for five additional hours. The fatty acid product was converted into the corresponding wax esters in quantities corresponding to 96% of the theoretical yield.

Example VI 200 gm. of a fatty acid mixture composed of the lower fraction of coconut oil wherein the carbon chains had from 8 to 10 carbon atoms, said mixture having an acid number of 354 and a saponification number of 358, were admixed with 20 gm. Raney cobalt and then heated at 260° C. in an atmosphere of producer gas (about 65% $N_2$, 34% CO, 1% $CO_2$) at a pressure of 150 atmospheres gauge. After about ten hours of heating, the fatty acids were transformed into the corresponding ester mixture in quantities equivalent to about 60% of theory.

The same results were obtained when water gas (about 50% $H_2$, 40% CO, 5% $CO_2$ 4% $N_2$ and 1% hydrocarbons) was used in place of the producer gas.

Example VII 200 gm. butyric acid in admixture with 40 gm. fuller's earth were heated in an atmosphere of carbon monoxide, as described in Example I. After removal of the catalyst, the reaction product was rectified and analyzed. Excellent yields of the butyl ester of butyric acid (boiling point: 69–70° C. at 20 mm. Hg.) were obtained.

Example VIII 200 gm. benzoic acid were admixed with 20 gm. copper chromite and the mixture was heated in an atmosphere of carbon monoxide, substantially as described in Example I. The reaction product was then rectified to remove untransformed benzoic acid; the yield of benzyl benzoate was 40 to 50% of the theoretical yield.

Example IX 200 gm. benzoic acid and 200 gm. dekalin in admixture with 30 gm. copper chromite were heated for 10 hours at 280° C. in an atmosphere of carbon monoxide at a pressure of 100 atmospheres gauge. After removing the catalyst and the untransformed benzoic acid, benzyl benzoate was recovered from the dekalin solution with good yields.

Example X 596 gm. (2 mols) ketostearic acid, consisting of a mixture of 9- and 10-isomers, were stirred into 40 gm. molybdenum sulfide. The resulting mixture was heated for ten hours at 270–300° C. in an atmosphere of carbon monoxide at a pressure of 150 atmospheres gauge. The catalyst and the untransformed fatty acid were removed from the reaction product. The residue represented a very good yield of the corresponding fatty alcohol ester in the form of a practically colorless wax.

Example XI 300 gm. octyloxyacetic acid and 60 gm. of a nickel-containing hydrogenation catalyst were heated for eight hours at 280° C. in an atmosphere of carbon monoxide at a pressure of 200 atmospheres gauge. After the catalyst had been removed, the reaction product was obtained in the form of slightly discolored oil consisting principally of octyloxyethyl-octyloxyacetate; i.e., the octyloxethyl alcohol ester of octyloxyacetic acid.

Example XII 300 gm. of a technical grade oleic acid (acid number=194, saponification number=198, iodine number=86) were admixed with 60 gm. activated charcoal, and the mixture was charged into an autoclave. Carbon monoxide was introduced into the autoclave until the internal pressure reached 100 atmospheres gauge. Thereafter the autoclave and its contents were heated to 280° C. for eight hours, substantially as described in the preceding examples. After filtering off the charcoal, the characteristic values of the reaction product were determined; on the basis thereof, it was found that 49.5% of the theoretical yield of the expected ester was formed. The iodine number of the reaction product was reduced to 76, apparently because of the heat polymerization of polyunsaturated acids present in the starting material.

While we have illustrated our invention with the aid of certain specific embodiments, we wish it to be understood that we do not thereby intend to limit the present invention to these foregoing specific embodiments. Moreover, it will be apparent to persons skilled in the art that various changes and modifications can be made without departing from the spirit of the invention or the scope of the appended claims.

We claim:

1. The process of producing esters of organic carboxylic acids having the structural formula $$R-COO-CH_2-R$$

wherein R is selected from the group consisting of aliphatic radicals having from about 4 to 30 carbon atoms and the phenyl radical, which comprises subjecting a carboxylic acid having the structural formula $$R-COOH$$

wherein R has the meaning above indicated, to a reduction reaction in the liquid phase and at elevated temperatures with carbon monoxide in the presence of a reduction catalyst, wherein the amount of carbon monoxide is sufficient to effect a substantially complete reduction of said acid to said ester.

2. The process of producing esters of organic carboxylic acids having the structural formula $$R-COO-CH_2-R$$

wherein R is selected from the group consisting of aliphatic radicals having from about 12 to about 30 carbon atoms, which comprises subjecting a carboxylic acid having the structural formula $$R-COOH$$

wherein R has the meaning above indicated, to a reduction reaction in the liquid phase and at elevated temperatures with carbon monoxide in the presence of a reduction catalyst wherein the amount of carbon monoxide is sufficient to effect a substantially complete reduction of said acid to said ester.

3. The process of producing the dodecyl alcohol ester of lauric acid, which comprises subjecting lauric acid in the liquid phase to a reducing reaction with carbon monoxide at elevated temperatures and pressures in the presence of copper chromite as a reduction catalyst wherein the amount of carbon monoxide is sufficient to effect a substantially complete reduction of said acid to said ester.

4. The process of producing the octyloxyethyl ester of octyloxyacetic acid which comprises subjecting octyloxyacetic acid in the liquid phase to a reduction reaction with carbon monoxide at elevated temperatures and pressures in the presence of a nickel-containing hydrogenation catalyst wherein the amount of carbon monoxide is sufficient to effect a substantially complete reduction of said acid to said ester.

5. The process of claim 2 wherein the carboxylic acid is paraffin fatty acid.

6. The process of claim 2 wherein the carboxylic acid is hydrostearic acid.

7. The process of producing coconut oil fatty esters which comprises subjecting coconut oil fatty acid in the liquid phase to a reducing reaction with carbon monoxide at elevated temperatures and pressures in the presence of copper chromite as a reduction catalyst, wherein the amount of carbon monoxide is sufficient to effect a substantially complete reduction of said acid to said ester.

References Cited in the file of this patent

UNITED STATES PATENTS

| | | |
|---|---|---|
| 1,997,172 | Goldschmidt et al. | Apr. 9, 1935 |
| 2,127,367 | Normann et al. | Aug. 16, 1938 |
| 2,542,767 | Gresham et al. | Feb. 20, 1951 |
| 2,549,455 | Gresham et al. | Apr. 17, 1951 |

OTHER REFERENCES

Bennett: Chemical and Technical Dictionary, 1947, page 793.